United States Patent
Shimizu et al.

[11] Patent Number: 6,059,063
[45] Date of Patent: May 9, 2000

[54] AUTOMATIC STEERING SYSTEM FOR VEHICLE

[75] Inventors: Yasuo Shimizu; Katsuhiro Sakai, both of Saitama, Japan

[73] Assignee: Honda Giken Kogyo Kabushiki Kaisha, Tokyo, Japan

[21] Appl. No.: 09/067,007

[22] Filed: Apr. 27, 1998

[30] Foreign Application Priority Data

Apr. 28, 1997 [JP] Japan .................................. 9-111213

[51] Int. Cl.⁷ ....................................................... B60S 9/00
[52] U.S. Cl. ........................... 180/204; 7001/23; 7001/25; 7001/41
[58] Field of Search ..................................... 180/199, 204, 180/443, 446; 701/23, 25, 26, 41

[56] References Cited

U.S. PATENT DOCUMENTS

| | | | |
|---|---|---|---|
| 4,735,274 | 4/1988 | Good et al. ............................. | 180/204 |
| 4,931,930 | 6/1990 | Shyu et al. ............................. | 180/199 |
| 5,742,141 | 4/1998 | Czekaj .................................... | 180/199 |
| 5,931,252 | 8/1999 | Shimizu et al. ........................ | 701/41 |
| 5,945,799 | 8/1999 | Shimizu .................................. | 701/41 |
| 5,946,644 | 8/1999 | Cowan et al. .......................... | 701/41 |

FOREIGN PATENT DOCUMENTS

| | | |
|---|---|---|
| 3-74256 | 3/1991 | Japan . |
| 4-55168 | 2/1992 | Japan . |

*Primary Examiner*—Daniel G. DePumpo
*Attorney, Agent, or Firm*—Arent, Fox Kintner Plotkin & Kahn

[57] ABSTRACT

The present invention compensates for a variability in steering angle of a wheel when a vehicle has been stopped, thereby performing an accurate automatic steering. To guide a vehicle stopped at a start position via a reversing position to a target position, the vehicle is automatically steered based on data for a steering angle of a wheel relative to a previously stored traveling distance of the vehicle. The steering angle at the time when the vehicle is stopped at the start position (1) is varied every time and is not necessarily equal to an initial standard steering angle intended to start an automatic steering control. Therefore, at the start position, the automatic steering control of the vehicle is started after equalizing the steering angle of the wheel to the initial standard steering angle, so that the vehicle can be correctly guided to the target position.

10 Claims, 4 Drawing Sheets

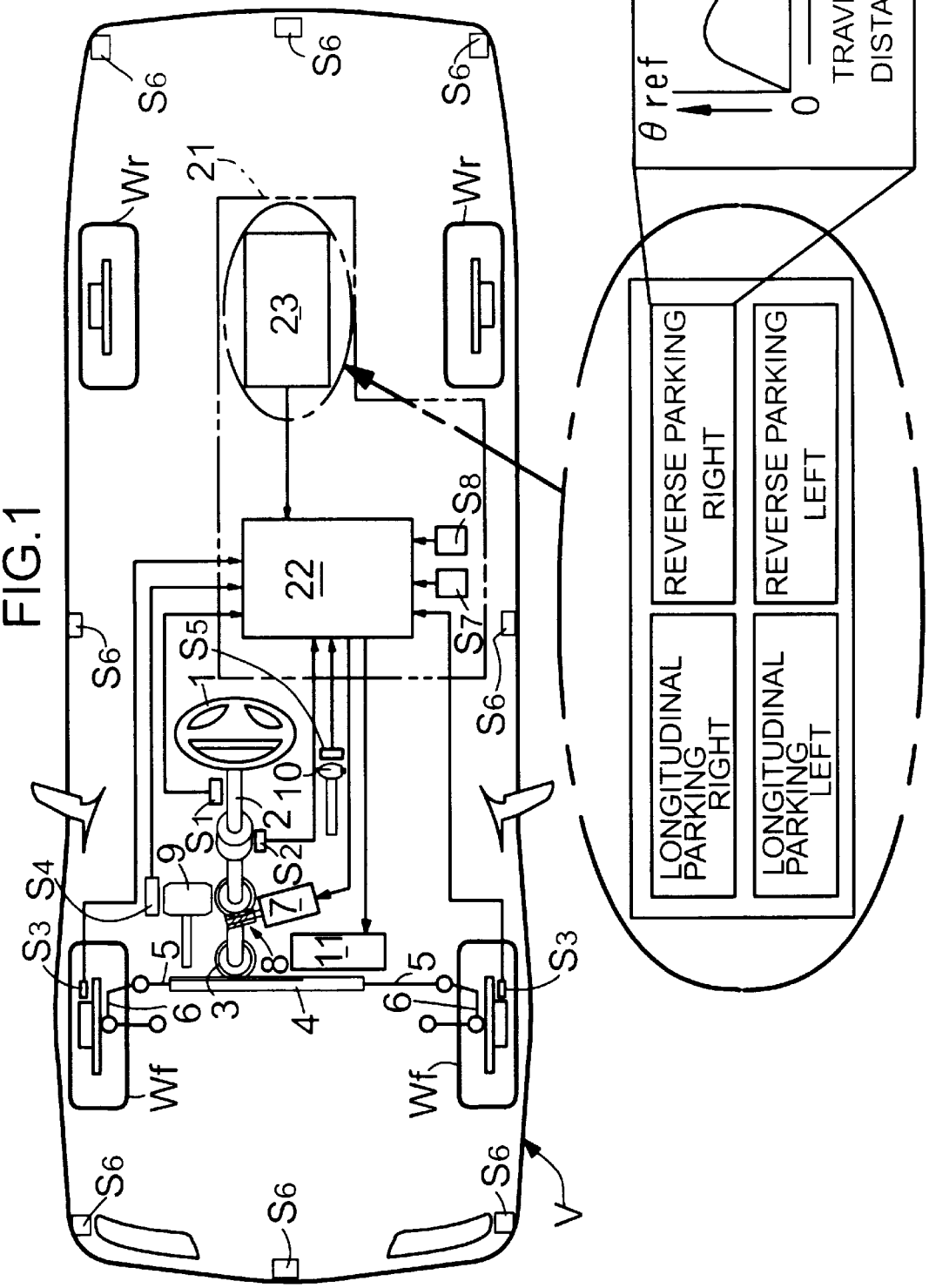

AUTOMATIC STEERING SYSTEM FOR VEHICLE

DESCRIPTION OF THE INVENTIONS

1. Field of the Invention

The present invention relates to an automatic steering system for a vehicle for automatically parking the vehicle without recourse to steering by a driver.

2. Background of the Invention

Automatic steering systems for vehicles are already known from Japanese Patent Application Laid-open Nos. 3-74256 and 4-55168. These automatic steering systems for vehicles utilize an actuator of a conventionally well-known electric power steering system, and are designed so that reverse parking or longitudinal parking is automatically performed by controlling the actuator based on a previously stored relationship between a traveling distance of the vehicle and a steering angle.

The guidance of the vehicle to a start position at which the automatic steering is started, is conducted based on a steering operation provided by a driver. Hence, the steering angle of the vehicle wheel at the time when the vehicle is stopped at the start position varies every time the vehicle is stopped. When automatic steering is started, the actuator controls the steering angle of the vehicle wheel based on a standard steering angle previously stored, but an initial standard steering angle, intended for permitting the start of the control, is not necessarily equal to an actual steering angle of the wheel of the vehicle which is stopped at the start position. Therefore, the following problem is encountered: When the automatic steering of the vehicle is started, a variability is generated in the time needed to equalize the actual steering angle of the wheel to the initial standard steering angle, and the locus of movement of the vehicle is deviated from a standard locus of movement for that time period.

SUMMARY OF THE INVENTION

The present invention has been accomplished with the above circumstance in mind. It is an object of the present invention to compensate for the variability in steering angle of the wheel at the time when the vehicle is stopped, thereby performing an accurate automatic steering.

To achieve the above object, according to the present invention, there is provided an automatic steering system for a vehicle, comprising a movement locus setting means for one of storing and calculating a locus of movement of a vehicle to a target position, an actuator adapted to steer wheels of the vehicle, and a control means for controlling the driving of the actuator based on the locus of movement set by the movement locus setting means, while the vehicle moves from a start position to a target position. The control means permits the control of the actuator, based on the locus of movement after equalizing the steering angle of the wheels to an initial standard steering angle by the actuator, when the vehicle has been shifted from a stopped state to a moving state at a point to perform the movement of the vehicle.

With the above arrangement, even if there is a variability in the steering angle of the wheels when the vehicle is in the stopped state, the control of the actuator, based on the locus of movement, is started after equalizing the steering angle to the initial standard steering angle of the wheels by the actuator. Hence, the vehicle can be guided correctly to the target position. The term "initial standard steering angle" is a steering angle which is an initial value when the driving of the actuator is controlled based on the locus of movement set by the movement locus setting means.

According to another embodiment of the present invention, there is provided an automatic steering system for a vehicle, comprising a movement locus setting means for one of storing and calculating loci of movement of a vehicle to a plurality of target positions, an actuator adapted to steer wheels of the vehicle, a control means for controlling the driving of the actuator based on the locus of movement set by the movement locus setting means, while the vehicle moves from a start position to a target position, a selecting means for selecting a locus of movement to any of the plurality of target positions, and a start indicating means for starting the control of the actuator based on the selected locus of movement. The control means permits the control of the actuator, based on the locus of movement after equalizing the steering angle of the wheels to an initial standard steering angle by the actuator, when the vehicle has been shifted from a stopped state to a moving state at a point to perform the movement of the vehicle.

With the above arrangement, even if there is a variability in the steering angle of the wheels when the vehicle is in the stopped state, the control of the actuator based on the locus of movement is started after equalizing the steering angle of the wheel to an initial standard steering angle by the actuator. Therefore, the vehicle can be correctly guided to the target position. Moreover, the guidance of the vehicle to a plurality of the target positions can be achieved, resulting in enhanced general-purpose utilization. The term "initial standard steering angle" is a steering angle which is an initial value when the driving of the actuator is controlled based on the locus of movement set by the movement locus setting means.

According to a modification of the present invention, when the locus of movement is selected by the selecting means, the steering angle of the wheels is equalized to the initial standard steering angle by the actuator.

With the above arrangement, a special operation is not required to equalize the steering angle of the wheels to the initial standard steering angle, resulting in enhanced convenience.

According to a further modification of the present invention, the operation of the start indicating means is prohibited until the steering angle of the wheels is equalized to the initial standard steering angle.

With the above arrangement, the control of the actuator based on the locus of movement cannot be started before the steering angle of the wheels is equalized to the initial standard steering angle. Thus, an actual locus of movement of the vehicle is reliably prevented from being deviated.

According to another modification of the present invention, the automatic steering system includes a brake input means operated by a driver, and the driving of the actuator based on the locus of movement is permitted when the brake input means is operated.

With the above arrangement, when the vehicle is moved near an obstacle, the brake input means is immediately operated to stop the vehicle.

BRIEF DESCRIPTION OF THE DRAWINGS

FIG. 1 is an illustration of the entire arrangement of a vehicle equipped with a steering control system.

DESCRIPTION OF THE PREFERRED EMBODIMENTS

Figure 2A:
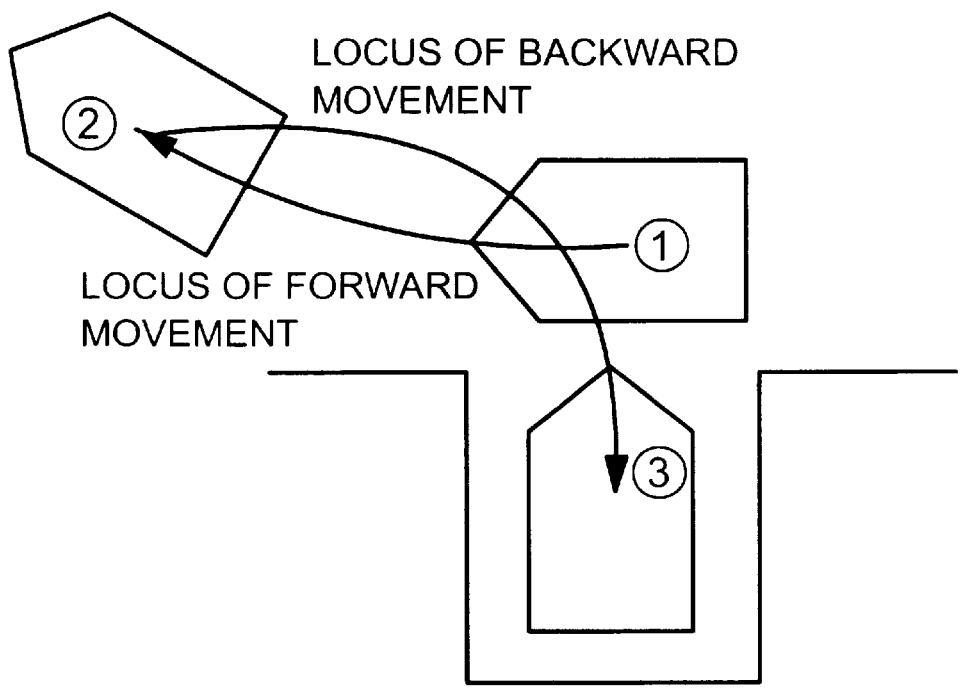
FIGS. 2A–2B are illustrations for explaining the operation in a reverse parking/left mode.

One embodiment for carrying out the present invention will now be described by way of an example shown in the accompanying drawings.

As shown in FIG. 1, a vehicle V includes a pair of front wheels Wf, Wf and a pair of rear wheels Wr, Wr. A steering wheel 1 and the front wheels Wf, Wf, which are steering wheels, are interconnected by a steering shaft 2 rotated in unison with the steering wheel 1, a pinion 3 provided at a lower end of the steering shaft 2, a rack 4 meshed with the pinion 3, left and right tie rods 5 provided at opposite ends of the rack 4, and left and right knuckles 6 connected to the tie rods 5. A steering actuator 7 having an electric motor is connected to the steering shaft 2 through a worm gear mechanism 8, in order to assist a driver to operate the steering wheel 1, or to conduct automatic steering for garaging of the vehicle (which will be described hereinafter).

A steering control unit 21 is comprised of a controller 22 and a storage means 23. Input to the controller 22 are signals from a) a steering angle detecting means $S_1$ for detecting a steering angle θ of the front wheels Wf, Wf based on the rotational angle of the steering wheel 1, b) a steering torque detecting means $S_2$ for detecting a steering torque of the steering wheel 1, c) front wheel rotational angle detecting means $S_3$, $S_3$ for detecting rotational angles of the left and right front wheels Wf, Wf, d) a brake operational amount detecting means $S_4$ for detecting the operational amount of a brake pedal 9 as a brake means, e) a shift range detecting means $S_5$ for detecting a shift range selected by a select lever 10 (a "D" range, "R" range, "N" range, "P" range or the like), and f) eight object detecting means $S_6$ mounted at a front portion, a central portion and a rear portion of the vehicle V. The object detecting means $S_6$ may be any known sonar, radar, television camera or the like. Lines connecting the eight object means $S_6$ and the controller 22 are omitted to simplify the drawings. The controller 22 constitutes a control means according to the embodiment of the present invention, and the storage means 23 constitutes a movement locus setting means according to the embodiment of the present invention.

Figure 4:
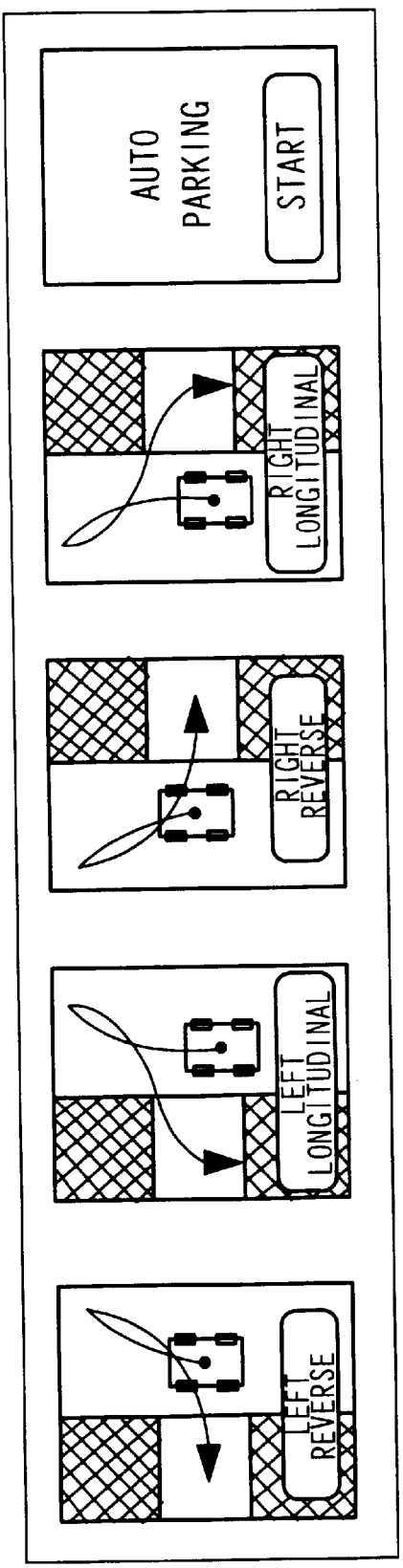
FIG. 4 is an illustration of a mode selecting switch and an automatic parking start switch.

As can be seen by reference also to FIG. 4, a mode selecting switch $S_7$ and an automatic parking start switch $S_8$, which are both operated by the driver, are connected to the controller 22. The mode selecting switch $S_7$ includes four buttons which are operated to select any of four parking modes: a reverse-parking/right mode, a reverse-parking/left mode, longitudinal parking/right mode, and longitudinal parking/left mode. The automatic parking start switch $S_8$ is operated to start automatic parking in any mode selected by the mode selecting switch $S_7$. The mode selecting switch $S_7$ constitutes a selecting means according to the embodiment of the present invention, and the automatic parking start switch $S_8$ constitutes a start indicating means according to the embodiment of the present invention.

Data for the four parking modes, i.e., relationships of standard steering angles θref to traveling distances X of the vehicle V are previously stored as a table in the storage means 23 (see FIG. 1). The traveling distance X of the vehicle V is calculated by multiplying the known peripheral length of the front wheels Wf by a rotational angle of the front wheels Wf detected by the front wheel rotational-angle detecting means $S_3$. Either one of a high-select value and a low-select value output from the pair of left and right front wheel rotational-angle detecting means $S_3$, $S_3$, and an average value of the high-select value and the low-select value is used for the calculation of the traveling distance X.

The controller 22 controls the operation of the steering actuator 7 and the operation of an operational stage display device 11 including a liquid crystal monitor, a speaker, a lamp, a chime, a buzzer, or the like, based on the signals from the detecting means $S_1$ to $S_6$ and the switches $S_7$ and $S_8$, and the data for the parking modes stored in the storage means 23.

The operation of the embodiment of the present invention having the above-described arrangement will be described below.

When the vehicle is in a normal state in which automatic parking is not carried out (when mode selecting $S_7$ is not operated), the steering control unit 21 functions as a regular power-steering control unit. More specifically, when the steering wheel 1 is operated by the driver to turn the vehicle V, the steering torque detecting means $S_2$ detects a steering torque input to the steering wheel 1, and the controller 22 controls the driving of the steering actuator 7 based on the steering torque. As a result, the left and right front wheels Wf, Wf are steered by the driving force from the steering actuator 7, thereby assisting the driver to steer the vehicle.

The automatic parking control will be described with reference to the reverse-parking/left mode (the mode in which parking is conducted while the vehicle is being moved backwards to a parking position on the left side of the vehicle V for example).

First, as shown in FIG. 2A, the vehicle V is moved near a garage where the vehicle V is to be parked by a steering operation provided by the driver. In a state in which the left side of the vehicle body has been located as close as possible to an inlet line of the garage, the vehicle V is stopped at a position (a start position (1)) at which a predetermined reference point (e.g., a left sideview mirror) is aligned with a center line of the garage. When the button (see FIG. 4) of the mode selecting switch $S_7$, which corresponds to the reverse parking/left mode, is depressed to start the automatic parking in the reverse parking/left mode, the button flashes, and the speaker of the operation stage display device 11 notifies the driver of "left reverse parking".

At this time, if automatic parking is started in a state in which the steering angle θ of the front wheels Wf, Wf of the stopped vehicle is not equal to an initial standard steering angle $\theta ref_0$ (see FIG. 2B) for the reverse parking/left mode stored in the storage means 23, the vehicle V is moved. For example, when a deviation $\Delta\theta_L$, $\Delta\theta_R$ between the steering angle θ and the initial standard steering angle $\theta ref_0$ is large at the start point, as shown in FIG. 3A, the vehicle V is moved through a distance $X_1$ until the deviation $\Delta\theta_L$, $\Delta\theta_R$ is eliminated. As a result, an actual locus of movement of the vehicle is deviated from a standard locus of movement, as shown in FIG. 3B. To avoid this problem, the following operation is carried out: If the steering angle θ is not equal to the initial standard steering angle $\theta ref_0$ at the start of the automatic parking, or if the deviation $\Delta\theta_L$, $\Delta\theta_R$ is not equal to or smaller than a predetermined value, the steering actuator 7 is operated to steer the front wheels Wf, Wf, thereby equalizing the steering angle θ to the initial standard steering angle $\theta ref_0$, or decreasing the deviation $\Delta\theta_L$, $\Delta\theta_R$ to a predetermined value or less.

If the driver operates the steering wheel 1 during the start of parking, the steering actuator 7 functions as a power steering unit. If the driver's hands remain off the steering wheel 1, the vehicle is restored to the above-described control. In this way, the control for equalizing the steering angle θ to the initial standard steering angle $θref_0$ is carried out only by operating the mode selecting switch $S_7$. Hence, it is unnecessary, for the driver to conduct a special operation of the vehicle, resulting in enhanced convenience. In the embodiment, the initial standard steering angle $θref_0$ is set at 0°.

If the steering angle θ is equalized to the initial standard steering angle $θref_0$ (including a case where the deviation $Δθ_L$, $Δθ_R$ is, for example, within 2°), the flashing of the mode selecting switch $S_7$ is changed to a lit state, thereby notifying the driver that automatic parking control is feasible, while at the same time, informing the driver that "it is possible to start the automatic parking" from the speaker of the operational stage display device 11. If the vehicle V has been moved without operation of the automatic parking start switch $S_8$ by the driver, then the steering angle θ is maintained at the initial standard steering angle $θref_0$ of the steering wheels Wf, Wf, and automatic parking control is not carried out.

If the automatic parking start switch $S_8$ is depressed in a state in which the button of the mode selecting switch $S_7$ has been lit, the button of the automatic parking start switch $S_8$ is lit to start the automatic parking control, whereby the speaker of the operational stage display device 11 notifies the driver of "slowly move the vehicle forwards". If the automatic parking start switch $S_8$ is depressed before the steering angle θ of the front wheels Wf, Wf is equalized to the initial standard steering angle $θref_0$ by the steering actuator 7 (i.e., while the button of the mode selecting switch $S_7$ is being flashed), the automatic parking start switch $S_8$ is not lit, but is flashed, thereby notifying the driver that the steering angle θ of the front wheels Wf, Wf is still not equal to the initial standard steering angle $θref_0$. In this state, the automatic parking control is not started.

In a state in which automatic parking control is being carried out with the button of the automatic parking start switch $S_8$ being lit, the current position of the subject vehicle, surrounding obstacles, the parking position, a presumed locus of movement of the subject vehicle from the start position to the parking position, the reversing position for switch-over from forward movement to backward movement and the like are indicated on the operational stage display device 11. In addition, various instructions and warnings are emitted by voice from the speaker to the driver. During automatic parking control, the vehicle V will only creep since the driver will slightly release the brake pedal 9 and the front wheels Wf, Wf are automatically steered based on the data for the reverse parking/left mode selected by the mode selecting switch $S_7$, even if the steering wheel 1 is not operated.

More specifically, while the vehicle V is moved forwards from the start position (1) to the reversing position (2), the front wheels Wf, Wf are automatically steered to the right. When the vehicle V has reached the reversing position (2), the speaker of the operational stage display device 11 notifies the driver of "stop the vehicle and carry out the shift change". When the driver has carried out the shift change, the speaker of the operational stage display device 11 notifies the driver of "move the vehicle backwards slowly". While the vehicle V is moved backwards from the reversing position (2) to a target position (3), the front wheels Wf, Wf are automatically steered to the left. When the vehicle V has reached the target position (3), the speaker of the operational stage display device 11 notifies the driver of "the left reverse parking has been completed and stop the vehicle", thereby finishing automatic parking control.

Figure 2B:
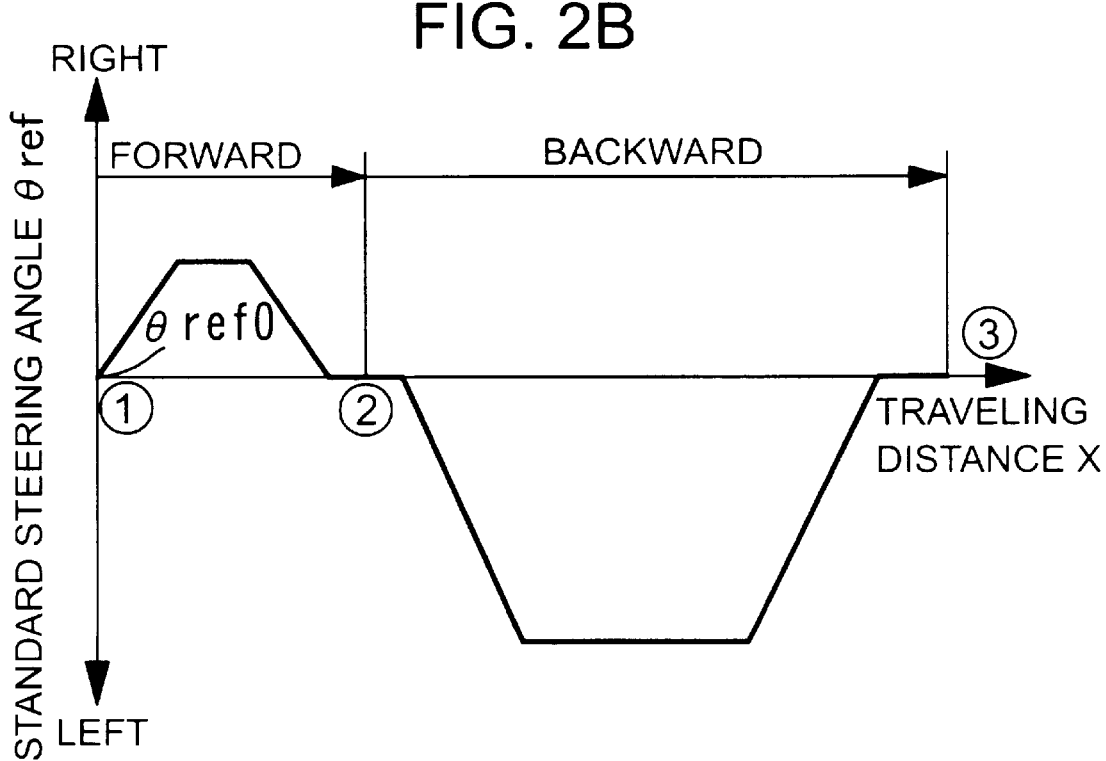
Figure 3A:
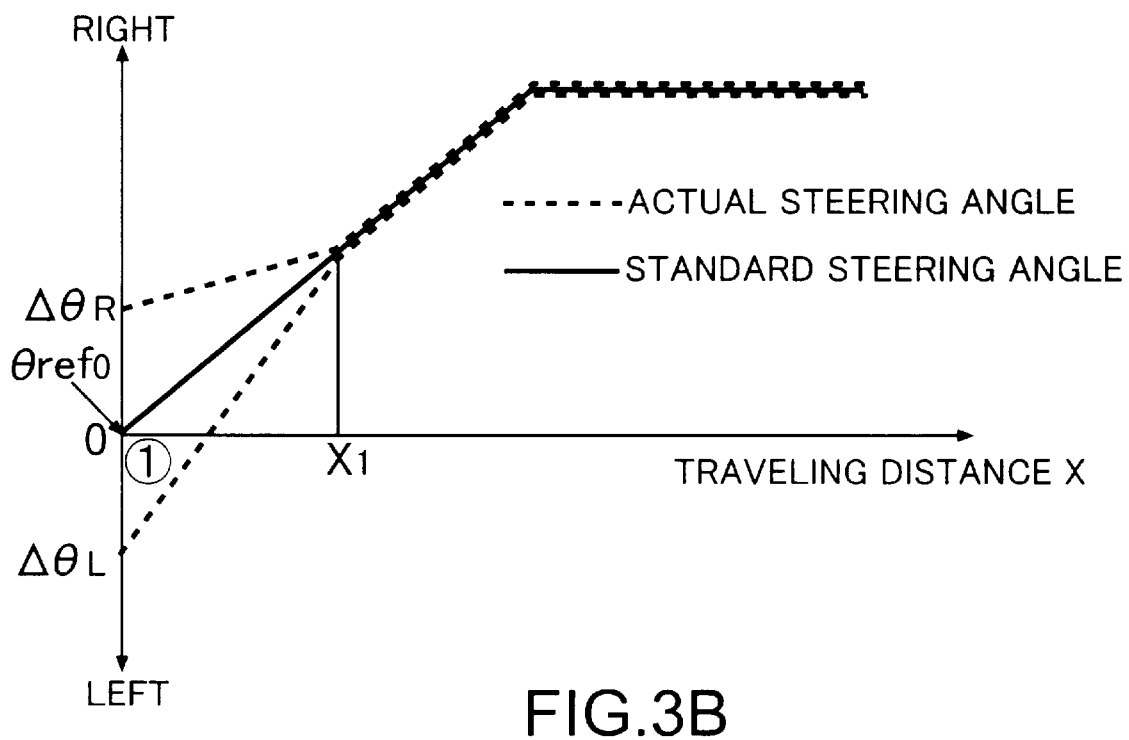
FIGS. 3A–3B are illustrations for explaining the operation when the steering angle θ is not equal to the initial standard steering angle $\theta ref_0$.
Figure 3B:
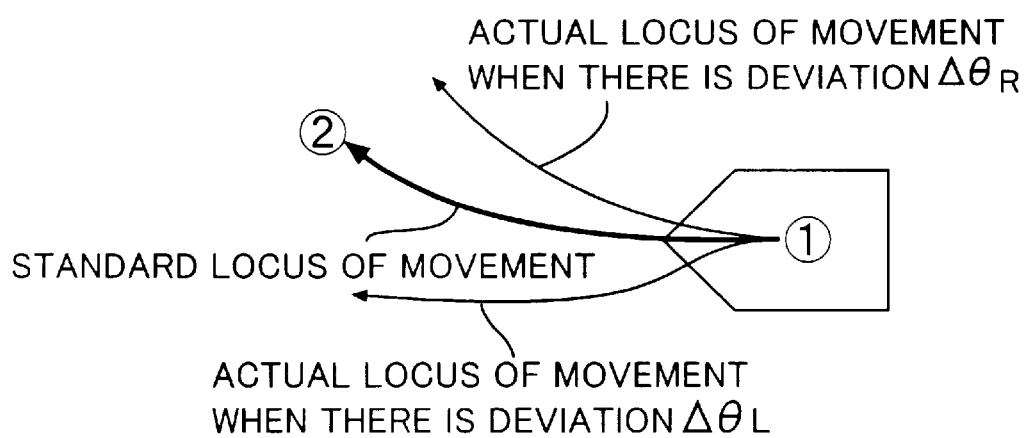

As can be seen from FIG. 2B, while automatic steering is being carried out, the controller 22 calculates a deviation E=(θref−θ) based on the standard steering angle θref in the reverse parking/left mode read out from the storage means 23 and the steering angle θ input from the steering angle detecting means $S_1$, and controls the operation of the steering actuator 7, so that the deviation E is equal to 0. At this time, the standard steering angle θref is set in correspondence to the traveling distance X of the vehicle V. Hence, even if there is a small variation in vehicle speed during creeping of the vehicle, the vehicle V is always moved on the above-described locus of movement.

The above-described automatic parking control is canceled when the driver has pushed the automatic parking start switch $S_8$ again during automatic parking control. In addition, when the driver has released the brake pedal 9 too much, causing the vehicle speed to exceed the maximum speed (e.g., 5 km/hr) suitable for automatic parking control, when the driver has operated the steering wheel 1, or when any of the object detecting means $S_6$ has detected an obstacle, automatic parking control is canceled and the actuator 7 is restored to the normal power-steering control.

As described above, even if the steering angle θ of the front wheels Wf, Wf is not equal to the initial standard steering angle $θref_0$ when the vehicle V has been stopped at the start position (1), automatic parking control is started after the actuator 7 is operated to cause the steering angle θ to be equalized to the initial standard steering angle $θref_0$. Therefore, it is possible to prevent an error from being generated in the locus of movement of the vehicle V, thereby performing an accurate automatic parking control.

The locus of movement of the vehicle V to the target position has been previously stored in the storage means 23 in the embodiment described above, but the locus of movement can be calculated from the current position and the target position of the vehicle V. In addition, the control for equalizing the steering angle θ to the initial standard steering angle $θref_0$ has been carried out at the start position (1) in the above embodiment, but if such control is carried out at every position at which the vehicle is stopped, such as at the reversing position (2), the accuracy of the movement of the vehicle following the locus of movement can be further enhanced. Further, the initial standard steering angle $θref_0$ has been set at 0° in the above embodiment, but the initial standard steering angle $θref_0$ can be changed to any value.

As discussed above, according to one embodiment of the present invention, the control means permits the control of the actuator based on the locus of movement after equalizing the steering angle of the wheels to an initial standard steering angle by the actuator, when the vehicle has been shifted from a stopped state to a moving state at a point in time to perform the movement of the vehicle. Therefore, even if there is a variability in steering angle of the wheels when the vehicle is in the stopped state, the vehicle can be correctly guided to the target position.

According to another embodiment of the present invention, the automatic steering system includes the selecting means for selecting either one of the plurality of loci of movement, and the start indicating means for starting the control of the actuator based on the selected locus of movement. Therefore, the guidance of the vehicle to any of the plurality of target positions is feasible, resulting in enhanced general-purpose utilization. When the vehicle has been shifted from a stopped state to a moving state at a point in time to perform the movement of the vehicle, the control of the actuator based on the locus of movement is permitted after equalizing the steering angle of the wheels to an initial standard steering angle by the actuator. Therefore, even if there is a variability in steering angle of the wheels when the vehicle is in a stopped state, the vehicle can be correctly guided to the target position.

According to a modification of the present invention when the locus of movement is selected by the selecting means, the steering angle of the wheels is equalized to the initial standard steering angle by the actuator. Therefore, it is unnecessary to conduct a special operation for equalizing the steering angle of the wheels to the initial standard steering angle, resulting in an enhanced convenience.

According to another modification of the present invention, the operation of the start indication means is prohibited until the steering angle of the wheels is equalized to the initial standard steering angle. Therefore, the control of the actuator based on the locus of movement cannot be started before the steering angle of the wheels is equalized to the initial standard steering angle. Thus, it is possible to reliably prevent the actual locus of movement of the vehicle from being deviated.

According to a further modification of the present invention, the automatic steering system includes a brake input means operated by a driver, and the driving of the actuator based on the locus of movement is permitted on a condition that the brake input means is being operated. Therefore, when the vehicle is moved near an obstacle, the brake input means can be immediately operated to stop the vehicle.

Although the embodiment has been described in detail, it will be understood that the present invention is not limited to the above-described embodiments, and various modifications in design may be made without departing from the subject matter of the present invention.

What is claimed is:

1. An automatic steering system for a vehicle, comprising:
   a movement locus setting means for one of storing and calculating a locus of movement of a vehicle to a target position;
   an actuator adapted to steer wheels of the vehicle; and
   a control means for controlling driving of said actuator based on the locus of movement set by said movement locus setting means, while the vehicle moves from a start position to a target position,
   wherein said control means permits said actuator to be controlled based on the locus of movement after equalizing a steering angle of the wheels to an initial standard steering angle by said actuator, when the vehicle has been shifted from a stopped state to a moving state at a point in time to perform movement of the vehicle.

2. An automatic steering system for a vehicle, comprising:
   a movement locus setting means for one of storing and calculating loci of movement of a vehicle to a plurality of target positions;
   an actuator adapted to steer wheels of the vehicle; and
   a control means for controlling driving of said actuator based on the locus of movement set by said movement locus setting means, while the vehicle moves from a start position to a target position;
   a selecting means for selecting a locus of movement to any of the plurality of target positions; and
   a start indicating means for starting control of said actuator based on the selected locus of movement,
   wherein said control means permits said actuator to be controlled based on the locus of movement after equalizing a steering angle of the wheels to an initial standard steering angle by said actuator, when the vehicle has been shifted from a stopped state to a moving state at a point in time to perform movement of the vehicle.

3. An automatic steering system for a vehicle according to claim 2, wherein when the locus of movement is selected by said selecting means, the steering angle of the wheels is equalized to the initial standard steering angle by said actuator.

4. An automatic steering system for a vehicle according to claim 2, wherein operation of said start indicating means is prohibited until the steering angle of the wheels is equalized to the initial standard steering angle.

5. An automatic steering system for a vehicle according to claim 3, wherein operation of said start indicating means is prohibited until the steering angle of the wheels is equalized to the initial standard steering angle.

6. An automatic steering system for a vehicle according to claim 1, including a brake means operated by a driver, wherein driving of said actuator based on the locus of movement is permitted when said brake means is operated.

7. An automatic steering system for a vehicle according to claim 2, including a brake means operated by a driver, wherein driving of said actuator based on the locus of movement is permitted when said brake means is operated.

8. An automatic steering system for a vehicle according to claim 3, including a brake means operated by a driver, wherein driving of said actuator based on the locus of movement is permitted when said brake means is operated.

9. An automatic steering system for a vehicle according to claim 4, including a brake means operated by a driver, wherein driving of said actuator based on the locus of movement is permitted when said brake means is operated.

10. An automatic steering system for a vehicle according to claim 5, including a brake means operated by a driver, wherein driving of said actuator based on the locus of movement is permitted when said brake means is operated.

* * * * *